US008904237B2

(12) United States Patent
Avadhanam et al.

(10) Patent No.: US 8,904,237 B2
(45) Date of Patent: Dec. 2, 2014

(54) FRAMEWORK FOR TESTING AND EVALUATING MOBILE COMMUNICATION DEVICES

(75) Inventors: Phani Bhushan Avadhanam, San Diego, CA (US); Nuthan Seegehalli Hanumanthappa, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 164 days.

(21) Appl. No.: 13/550,947

(22) Filed: Jul. 17, 2012

(65) Prior Publication Data
US 2014/0025993 A1 Jan. 23, 2014

(51) Int. Cl.
G06F 11/00 (2006.01)

(52) U.S. Cl.
USPC .................................. 714/32; 714/25; 714/46

(58) Field of Classification Search
CPC .................................................. G06F 11/3864
USPC ....................................................... 714/45, 25
See application file for complete search history.

(56) References Cited

U.S. PATENT DOCUMENTS

| 6,892,328 | B2 | 5/2005 | Klein et al. |
| 7,286,953 | B1 | 10/2007 | Li et al. |
| 7,809,369 | B2 | 10/2010 | Parmar et al. |
| 7,840,382 | B2 | 11/2010 | Avadhanam |
| 7,840,664 | B2 | 11/2010 | Dugatkin et al. |
| 7,856,580 | B2 | 12/2010 | Yang |
| 8,028,188 | B2 | 9/2011 | Karthikeyan et al. |
| 2002/0162059 | A1* | 10/2002 | McNeely et al. .............. 714/703 |
| 2003/0231741 | A1 | 12/2003 | Rancu et al. |
| 2007/0124114 | A1 | 5/2007 | Shapiro et al. |
| 2007/0266289 | A1 | 11/2007 | Yang |
| 2008/0010537 | A1* | 1/2008 | Hayutin et al. .................. 714/38 |
| 2009/0077539 | A1 | 3/2009 | Booth |
| 2010/0227607 | A1 | 9/2010 | Lorion et al. |
| 2010/0229112 | A1* | 9/2010 | Ergan et al. .................... 715/764 |

FOREIGN PATENT DOCUMENTS

| JP | 2010048683 A | 3/2010 |
| WO | 9912228 A2 | 3/1999 |

OTHER PUBLICATIONS

Couperus, Frans, "Mobile Device Automated Testing and Certifcation: Profit or Peril, Pain vs. Gain", "Power Point Presentation", Apr. 29, 2008, p. 20 Publisher: w2bi, Inc., Published in: US.

* cited by examiner

Primary Examiner — Sarai Butler
(74) Attorney, Agent, or Firm — Neugeboren O'Dowd PC

(57) ABSTRACT

A framework and associated systems and methods for testing mobile communication devices are disclosed. An exemplary method includes receiving user-action data from each of a plurality of user-action-capture devices. The user-action data received from the user-action-capture devices includes data that characterizes a plurality of user actions that were performed on the user-action-capture devices. The user-action data is consolidated into generic representations of the user actions to create a superset of generally-applicable-user-action data, and each generic representation of a user action in the superset represents two or more similar user actions. The generally-applicable-user-action data is then used to test mobile communication devices that are different than the user-action-capture devices.

24 Claims, 6 Drawing Sheets

```
<App>
<Name>Camera</Name>
<Action>adjustZoom</Action>
<Action>click</Action>
<Action>cameraGallery</Action>
<Action>galleryRandomPic</Action>
<Action>picOptions</Action>
<Action>crop</Action>
<Action>picOptions</Action>
<Action>rotateLeft</Action>
</App>
```

FIG. 3A

```
def adjustZoom(device) :
    height = returnHeight(device)
    width = returnWidth(device)
    touchHeight = int(.72*height)
    focusMax = int(.75*width)
    focusMin = int(.25*width)
    touchWidth = random.randint(focusMin,focusMax)
    touchWidthBack = random.randint(focusMin,focusMax)
    device.drag((focusMin, touchHeight), (touchWidth,touchHeight), 0.2, 25)
    MonkeyRunner.sleep(1)
    device.drag((touchWidth , touchHeight), (touchWidthBack, touchHeight),
    0.2, 25
    return
```

FIG. 3B

FRAMEWORK FOR TESTING AND EVALUATING MOBILE COMMUNICATION DEVICES

FIELD OF THE INVENTION

The present invention relates to computing devices. In particular, but not by way of limitation, the present invention relates to testing and evaluation of mobile communication devices.

BACKGROUND OF THE INVENTION

Mobile communication devices, such as smartphones and tablet computers, are capable of running applications (e.g., educational, gaming, financial, and utility applications) that are useful in a variety of contexts. These mobile communication devices are becoming increasingly more and more complex in terms of the hardware that resides on the mobile communication devices and the operating systems and software applications that are employed to interoperate with the hardware. As a consequence, there are an increasing number of potential faults or bugs that may occur in these complicated communication devices.

To detect and address bugs before new releases are sent out the general public, mobile communication devices are provided to what are known as "friendly user test users (FUTs)" that utilize mobile communication devices for a period of time that may exceed six weeks. Once this test period is over, data logs from the test devices are collected and analyzed to help identify and repair any issues in software and/or hardware. This process, however, is very expensive because of the time and money that is required to set up the test devices, find knowledgeable and reliable users, collect the logs, and then post-process the logs to analyze user actions.

Simultaneously with the development of more complicated mobile devices, there is increasing pressure upon hardware developers, software developers, and mobile device integrators to more quickly release improved and updated versions of their products or services. As a consequence, the typical expensive approach to field-testing mobile communication devices is, at best, less than desirable and will likely become more and more unsatisfactory in the future as mobile communication devices become more complicated and product development cycles become shorter.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Several aspects of the invention include a method for testing mobile communication devices that includes receiving user-action data from each of a plurality of user-action-capture devices that characterizes a plurality of user actions that were performed on the user-action-capture devices. The user-action data is then consolidated into generic representations of the user actions to create a superset of generally-applicable-user-action data, and the generally-applicable-user-action data is used to test mobile communication devices that are different than the user-action-capture devices.

Aspects of the invention may also be characterized as a system for testing mobile communication devices that includes a plurality of user-action-capture devices that are each adapted to capture user-action data that characterizes a plurality of user actions that are performed on the user-action-capture devices. The system also includes a test center that is adapted to receive the user-action data from each of the plurality of user-action-capture devices. The test center includes a user-action consolidation component that consolidates the user-action data into generic representations of the user actions to create a superset of generally-applicable-user-action data. The test center also includes a datastore to store the superset of the generally-applicable-user-action data and a device testing component to test, using the generally-applicable-user-action data, mobile communication devices that are different than the user-action-capture devices.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

FIG. 3A depicts user-action data associated with a specific device;

FIG. 3B depicts a generic representation of the user action data shown in FIG. 3A;

DETAILED DESCRIPTION

Various aspects are now described with reference to the drawings. In the following description, for purposes of explanation, numerous specific details are set forth in order to provide a thorough understanding of one or more aspects. It may be evident, however, that such aspects may be practiced without these specific details.

Figure 1:
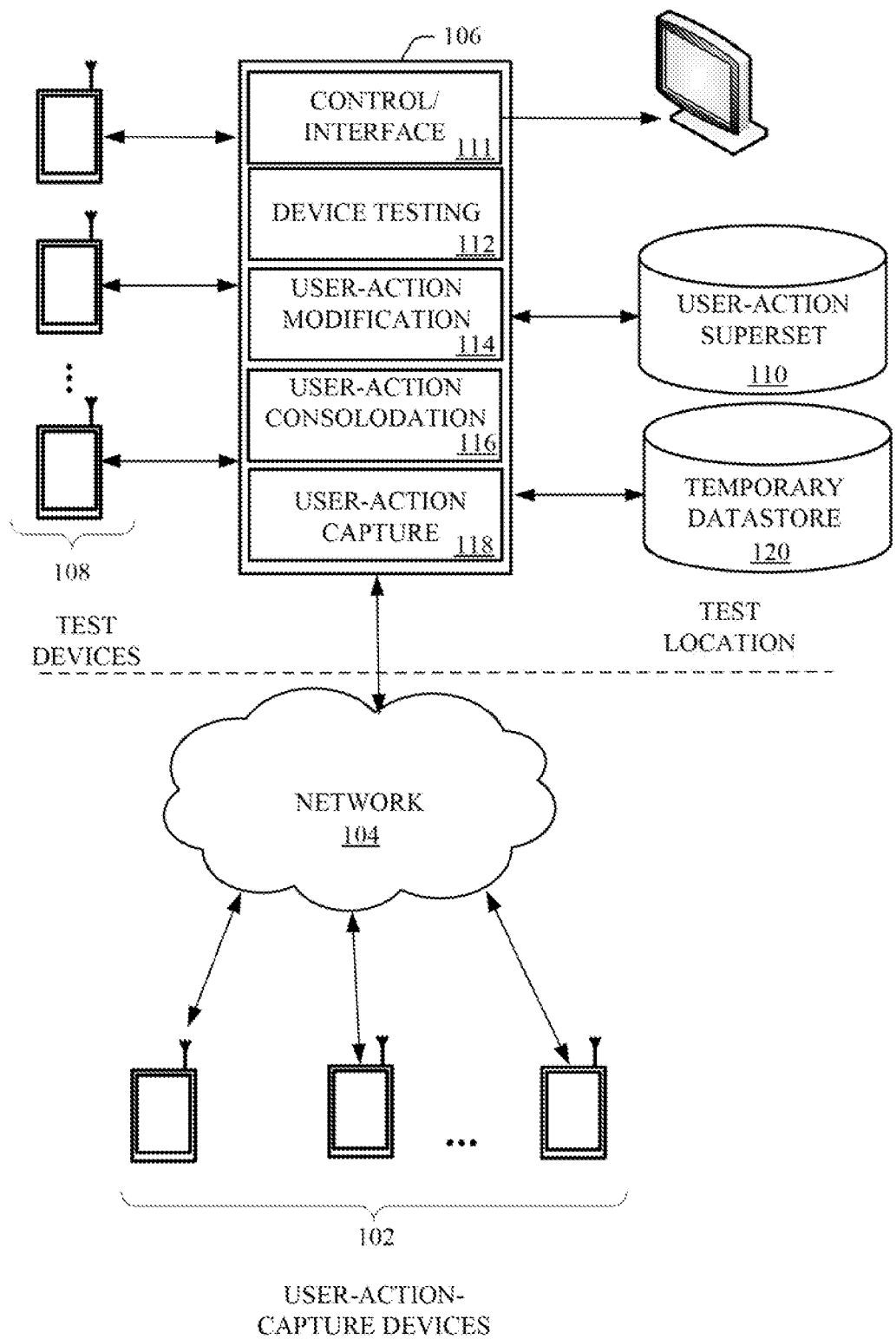
FIG. 1 illustrates an environment and exemplary aspects of the present invention.

Referring first to FIG. 1, shown is an environment in which exemplary embodiments of the present invention may be realized. As shown, a test location is in communication with a plurality of user-action-capture devices 102 via a network 104, and the test location includes a test center 106 that is coupled to a plurality of test devices 108 and a user-action superset 110. As depicted, the test center 106 includes a control interface component 111, a device testing component 112, a user-action modification component 114, a user-action consolidation component 116, and a user-action capture component 118.

The illustrated arrangement of the components in the test center 106 is logical, and the depiction of this embodiment is not meant to be an actual hardware diagram; thus, the components can be combined or further separated in an actual implementation, and the components can be connected in a variety of ways without changing the basic operation of the system. As one of ordinary skill in the art will appreciate in view of this disclosure, the components of the test center 106 may be realized by hardware, software, firmware, or combinations thereof.

The user-action-capture devices 102 and the test devices 108 may be realized by mobile communication devices including smartphones, PDAs, netbooks, tablets, and other wireless devices. But the user-action-capture devices 102 and the test devices 108 may work in tandem with wireline and wireless communication devices. In many implementations, the user-action-capture devices 102 and the test devices 108 include components (as discussed further herein) associated with cellular communication to enable a user to communicate by voice communication with others and to access remote networks, including the Internet, known cellular networks (e.g., CDMA, GPRS, LTE, and UMTS networks), and yet to be developed communication networks.

The network 104 may include a combination of cellular, local area networks, wide area networks, and the Internet. And although the exemplary embodiment depicted in FIG. 1 depicts user-action-capture devices 102 that are remotely coupled to the test center 106 via the network 104, it is also contemplated the user-action-capture devices 102 may be physically collected (after they are used to collect user-action data) and moved to the test location so that captured user-action data may be retrieved by a more direct connection than the network 104.

The depicted user-action superset 110 and temporary datastore 120 may be realized by a variety of different types of storage media including magnetic and optical storage media, and although the user-action superset 110 and temporary datastore 120 are shown as separate components, the data associated with each component may be stored on distributed storage mediums or a single contiguous storage medium (e.g., a single hard drive).

In general, the test center 106 operates to produce generally-applicable-user-action data based upon user-action data that is collected from the plurality of user-action-capture devices 102, and the test center 106 uses the generally-applicable-user-action data to evaluate the test devices 108 (e.g., software, firmware, and/or hardware components of the test devices 108) at the test location. Although the collection of user-action data from the user-action-capture devices 102 may, at times, be a time consuming process that requires the assistance of friendly test users over several weeks, once the user-action data is captured and consolidated into the generally-applicable-user-action data, many other communication devices, of varying types, may be quickly and inexpensively tested with the generic user-action data without the assistance of users in the field; thus saving an enormous amount of money and expediting the testing process.

In operation, the control interface component 111 enables a user to interact with, and control (e.g., via a display, pointing device, and keypad), the test center 106. The user-action capture component 118 generally operates to receive user-action data from the user-action-capture devices 102 and temporarily store the user-action data in a temporary datastore 120 so that the user-action consolidation component 116 may consolidate the user-action data into generally applicable user-action data that may be stored in the user-action superset 110 and used to test the test devices 108.

Figure 2:
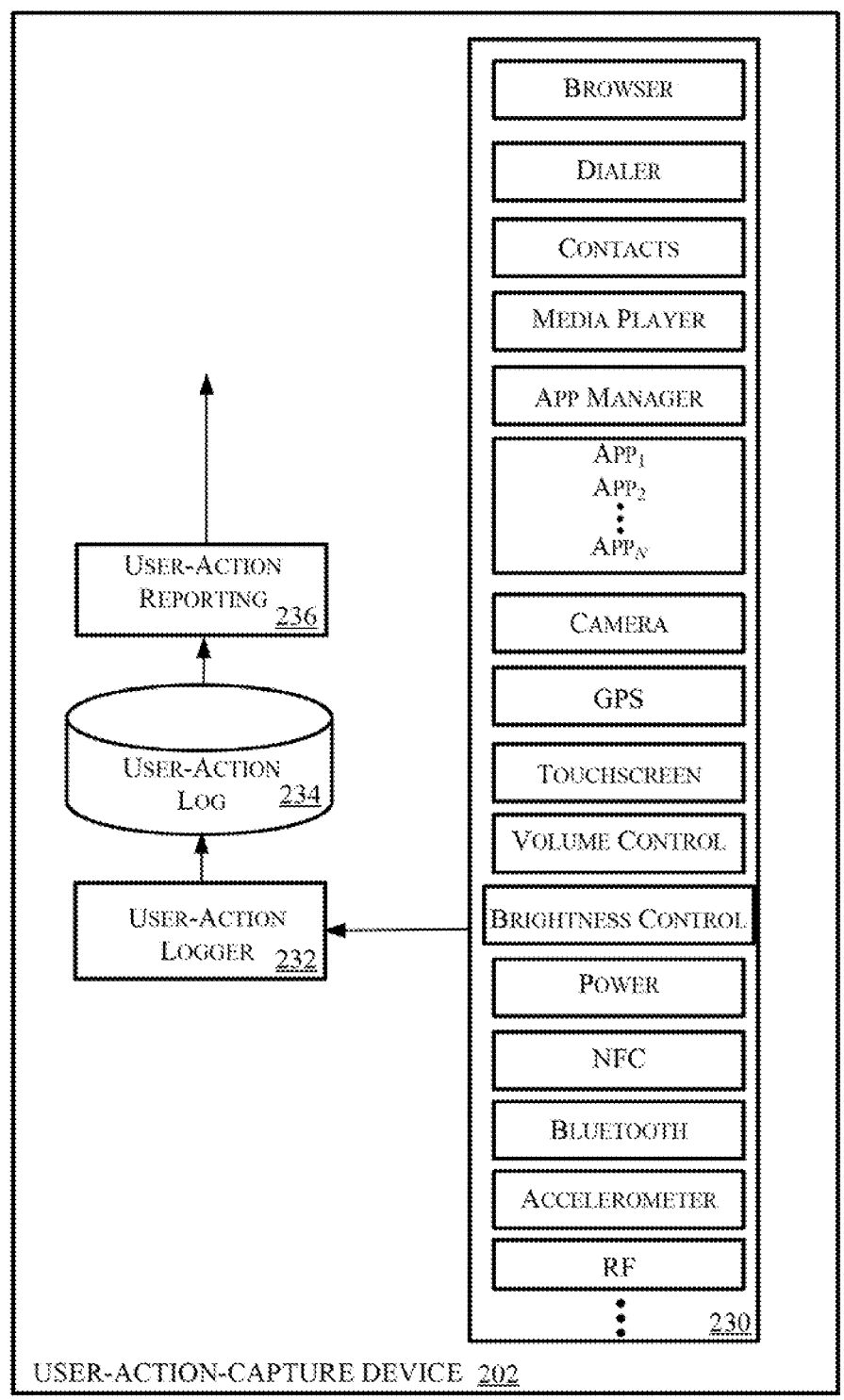
FIG. 2 is a block diagram depicting components of an exemplary user-action-capture device depicted in FIG. 1.

In general, the user-action data that is captured from the user-action-capture devices 102 includes data that characterizes a plurality of user actions that were performed by users on the user-action-capture devices 102. Referring to FIG. 2, shown is an exemplary user-action-capture device 202 that may be utilized to capture user actions. As shown, the user-action-capture device 202 may include several components 230 that a user may interact with by taking various types of user actions. For example, the components 230 may include applications such as a browser, a dialer, a contacts app, a media player, an app manager, and N other apps that a user may take user actions to interact with. For example, the N other apps may include any of a variety of apps including educational, gaming, financial, and utility applications. In addition, the components 230 may include a camera, a GPS system, a touchscreen, volume control, brightness control, power management, near field communications, Bluetooth, an accelerometer, RF components (e.g., cellular transceiver components), and potentially many other software and hardware components.

As shown, a user-action logger 232 captures and stores the user actions that occur in connection with the components 230 in a user-action log 234, which stores the user-action data until the user-action data is reported by a user-action reporting component 236 to the user-action capture component 118 depicted in FIG. 1. Some examples of user actions include physical actions of a user (e.g., touch screen gestures, key activation, switch operation, voice actions, and gross movement of the user-action-capture device 202) and/or the associated device functions that the user is effectuating including, for example without limitation, originating or terminating a voice call; user actions carried out in connection with originating or terminating an SMS message; user actions associated with browsing to a particular website; opening multiple tabs in a browser (e.g., each tab including different media content); user actions associated with GPS use; user actions associated with camera use; and user actions concurrently associated with more than one component on the communication device. Although not depicted for clarity, one of ordinary skill in the art will appreciate that the user-action-capture device 202 includes many components (e.g., software, firmware, and hardware components) that enable the user-action-capture device 202 to communicate with the network 104 and that are used to realize the user-action logger 232, the user-action log 234, and the user-action reporting component 236.

Due to the high number of software and hardware components that reside on a mobile device, the potential number of user actions that may be performed is enormous. And in addition, the types of user actions that users carry out are often unpredictable, so capturing actual user actions from actual users that use the user-action-capture devices 102, 202 provides valuable user-action data that is "recreated" by converting the user-action data to generally-applicable user-action data that is used on the test devices 108.

Referring again to FIG. 1, the user-action capture component 118 may either prompt the user-action-capture devices 102 to send user-action data to the testing center 106, or the user-action-capture devices 102 may automatically send user-action data to the test center 106 when one or more events occur. For example, the user-action-capture devices 102 may periodically send user-action data to the test center 106 on a known time schedule, or the user-action-capture devices 102 may send user-action data to the test center 106 after a specific quantity of user-action data is captured.

Once the user-action capture component 118 receives the user action data from the user-action-capture devices 102, the captured user-action data is temporarily stored in the temporary datastore 120. Referring to FIG. 3A, shown is user-action data associated with operation of a camera component of a mobile communication device, which is in XML format.

As shown in FIG. 1, the user-action consolidation component 116 consolidates the user-action data into generic representations of the user actions to create generally-applicable-user-action data that is stored in the user-action superset 110. The consolidation may include categorizing the captured user-actions into more tangible tasklets, which may take the form of any exercisable set of instructions that effectively recreate user actions on the test devices 108 that previously took place on one or more of the user-action-capture devices 102.

For example, the tasklets may take the form of XML data with complete instructions of the tasks to be performed; an EXCEL datasheet with step-by-step instructions; programmable interface data, which can be automatically executed; and other forms of instructions to various levels of APIs across the software stack of a mobile communication device. Referring to FIG. 3B for example, shown is generally-applicable user action data that may (e.g., using more information about a user-action-capture device including data logs, screen size, operating system etc.) be generated from the user-action data depicted in FIG. 3A.

The device testing component 112 generally operates to access the user-action superset 110 to retrieve the generally-applicable-user-action data and send test data (that defines user actions in the generally-applicable-user action data) to evaluate the effects of the user actions on the test devices 108. In some embodiments, the device testing component 112 translates the generally-applicable-user-action data so that the device testing component 112 sends test data that includes device-specific representations of the user actions that are specific to a particular type of communication device that is being tested. In other embodiments, the device testing component 112 sends test data that includes the generic representations of the user actions to the testing devices 108, and the testing devices 108 translate the generic representations into a format that is specific to the type of device that is being tested.

Figure 4:
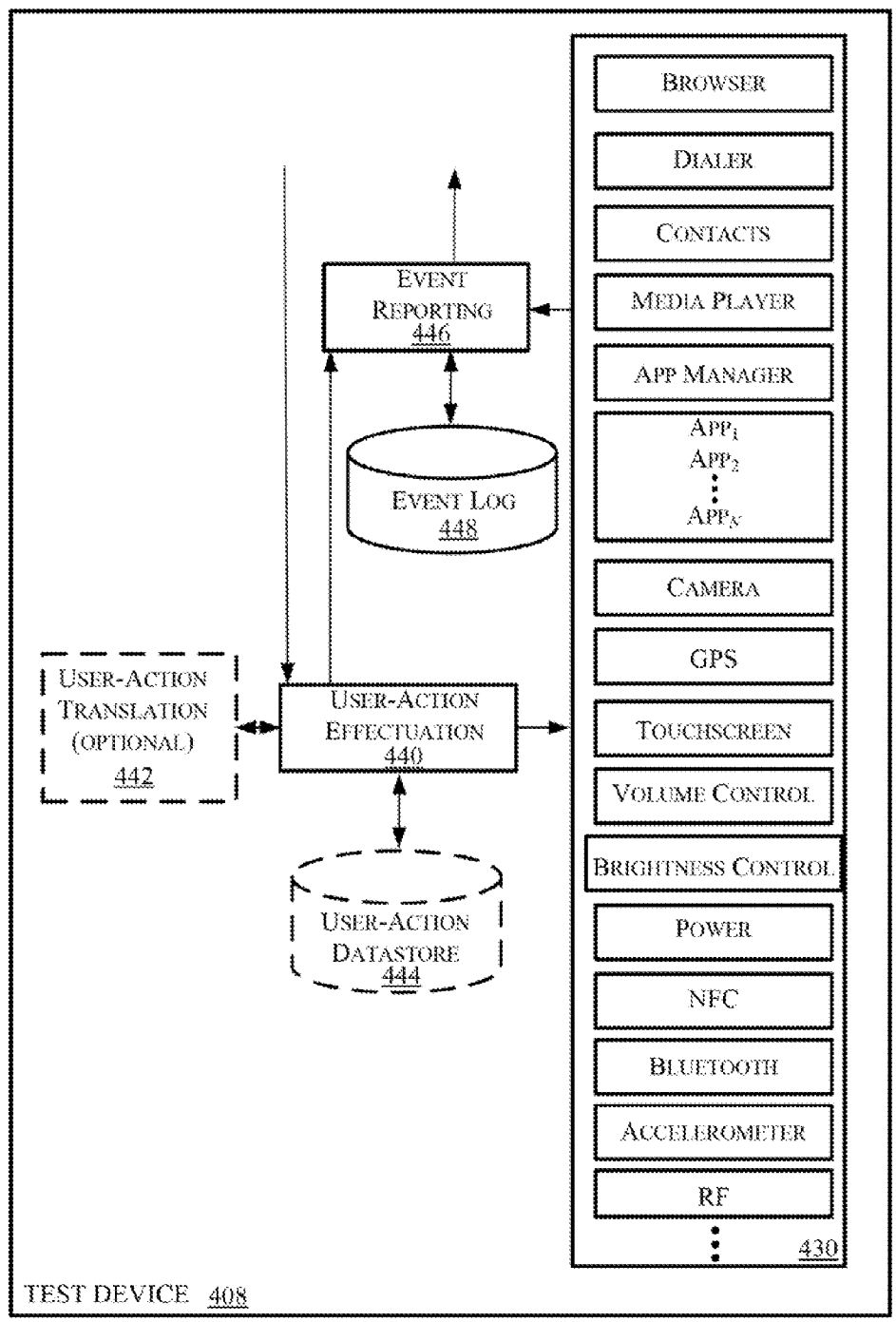
FIG. 4 is a block diagram depicting components of an exemplary test device.

Referring to FIG. 4, shown are components of an exemplary test device 408. As shown, the test device 408 in this embodiment includes a user-action effectuation component 440 that receives test data that may either be generic representations of the user actions or device-specific representations of user-actions that are formatted and organized in a manner that is specific to a type of the test device 408. As shown, if the test device 408 receives generic representations of user actions (e.g., a tasklet), an optional user-action translation component 442 translates the generic representations of the user actions into device-specific user-actions. Also shown is an optional user-action datastore 444 that enables several sets of user actions to be stored and retrieved from the test center 106 for serial or parallel execution on the test device 408.

In operation, the user-action effectuation component 440 controls particular ones of the components 430 on the test device to execute the user actions that are represented by the test data received by the test device 408. If the user actions are actions that initiate, focus, and capture an image with a camera, for example, the user-action effectuation component 440 then initiates those actions to mimic the actions that a user would make to take a picture. Thus, the user-action effectuation component 440 recreates user actions on the test device 408 that initially took place by an actual user on one or more of the user-action-capture devices 102.

Beneficially, the user-action effectuation component 440 can quickly execute user actions associated with some, most, or all of the components 430 to mimic what actual users have done on actual communication devices (e.g., the user-action-capture devices 102), but the user-action effectuation component 440 can execute the myriad of user actions over a time frame that is much, much shorter and/or much less expensive than it would take to have actual users test the test device 408.

As shown, an event-reporting component 446 captures event information associated with events that occur on the test device 408 in connection with the user actions that are carried out by the user-action effectuation component 440. And the event reporting component 446 reports the event information to the device testing component 112 so that the device testing component 112 may facilitate an assessment of whether the test device 408 is operating as expected, whether there are bugs in the software, firmware, or hardware operating on the test device 408, and information about performance metrics that characterize how the test device 408 responds to user actions.

As depicted, the event-reporting component 446 may be in communication with the user-action effectuation component 440 so that when a particular set of user actions (e.g., a set of user actions associated with operating the camera on the test device) are carried out, the event reporting component 446 may associate the particular set of user actions with the events that occur temporally proximate to the set of user actions that are carried out. In this way, the event-reporting component 446 may report information about the specific set of user actions that were carried out in connection with the events that occurred on the test device 408 in response to the user actions.

The test device 408 may provide the event information as it occurs to the device testing component 112, or optionally, an event log 448 may be utilized to store event information so that it may be uploaded to the device testing component 112 as a batch of test information.

Referring again to FIG. 1, a user-action modification component 114 enables the generally-applicable-user-action data (e.g., tasklets) in the user-action superset 110 to be modified. For example, if one or more new issues are found during testing of the test devices 108, or some more data points are achieved during the testing of the test devices 108, the a user-action modification component 114 may add, modify, or remove user-action data (e.g., tasklets) from the user-action superset 110. For example, tasklets may be altered or removed if sufficient data points are not achieved during testing of the test devices 108. As another example, more stringent conditions may be applied to achieve more test coverage while performing testing of the test devices 108.

Figure 5:
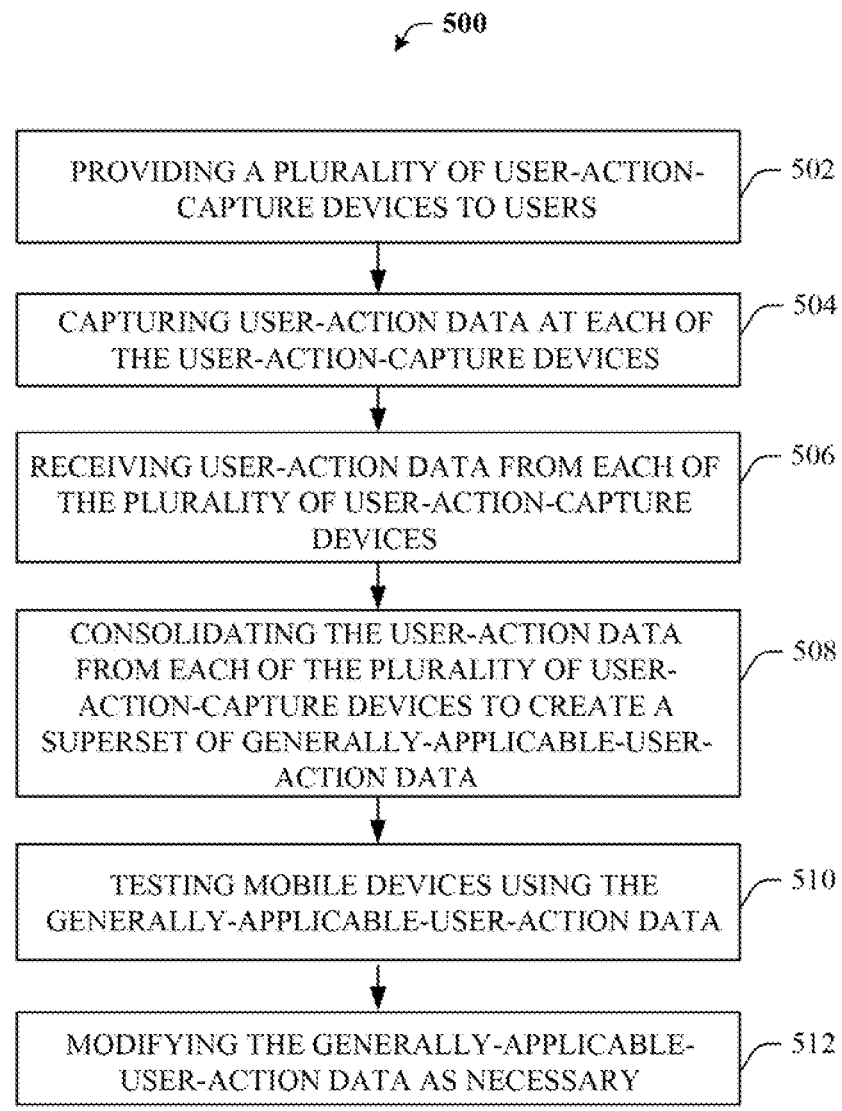
FIG. 5 is a flowchart depicting an exemplary method that may be traversed in connection with the embodiments described with reference to FIGS. 1-4.

Referring next to FIG. 5, it is a flowchart depicting methods that may be traversed in connection with the embodiments described herein. As shown, initially user-action-capture devices (e.g., user-action-capture devices 102) are provided to users (Block 502), and the user-action-capture devices are used to capture user-action data at each of the user-action-capture devices (Block 504). The captured user-action data is then received (e.g., at the test center 106) from each of the user-action-capture devices (Block 506)

As shown, the user-action data from the user-action-capture devices is then consolidated to create a superset of generally-applicable-user-action data (Block 508). As discussed above, the generally-applicable-user-action data includes generic user action data that is not specific to a particular type of communication device, and the generally-applicable-user-action data may be realized by tasklets that, as discussed above, are not limited to a particular format.

Test devices are then tested using the generally-applicable-user action data (Block 510). Because the generally-applicable-user action data is derived from actual user actions that are captured from actual mobile communication devices, the generally-applicable-user action data includes user-action data that accurately represents the types of actions that users carry out in a real-world environment; thus the test devices are tested by the rigors of recreated, real-world user actions. In addition, the test devices may be tested with this real-world user-action data much, much more quickly than if the test devices were placed in the hands of test users—saving an enormous amount of time and money, and enabling new software, hardware, and integrated communications devices to be released with fewer bugs and glitches than prior testing approaches allowed.

Figure 6:
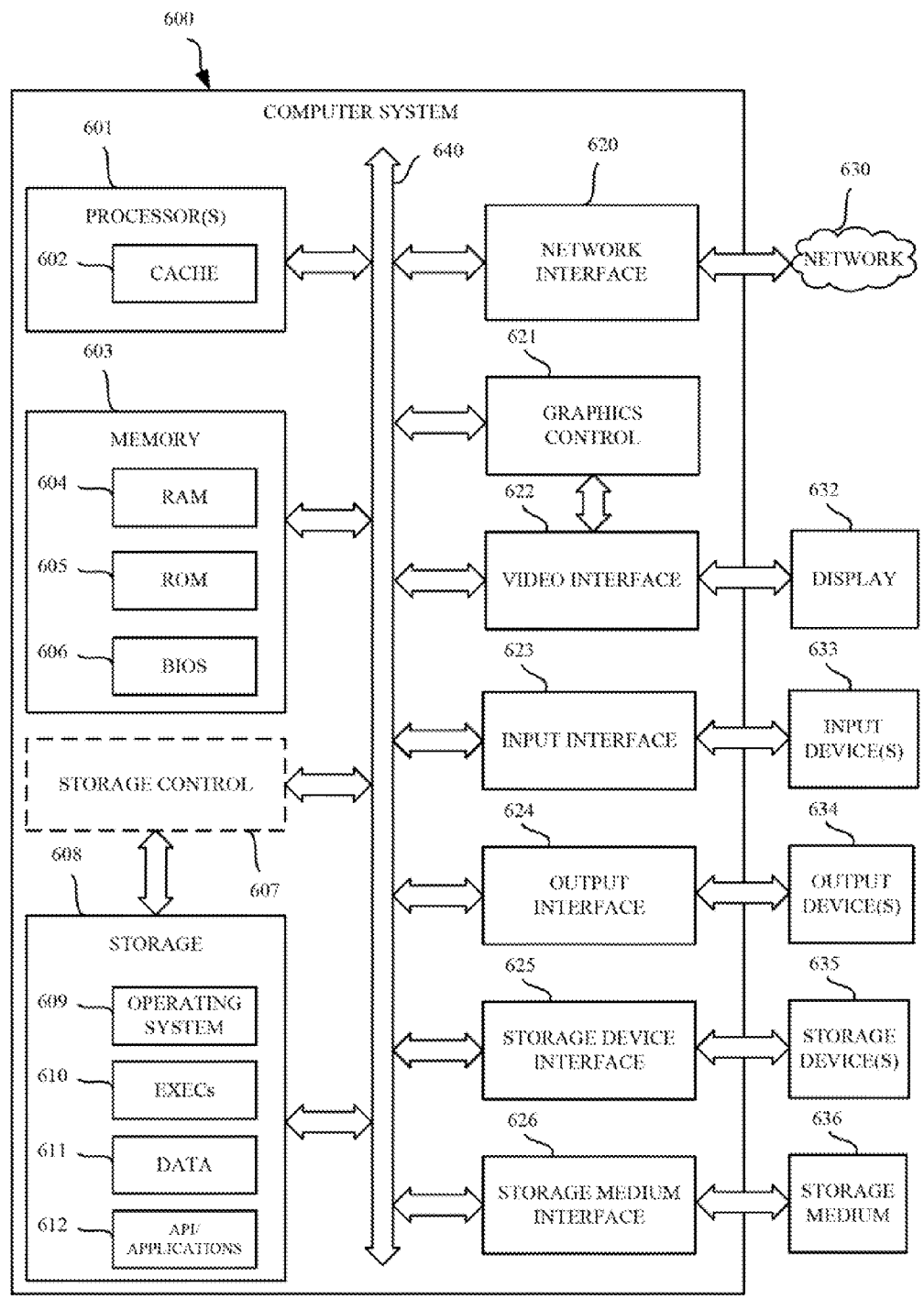
FIG. 6 is a block diagram that depicts exemplary physical components that may be used to realize devices described herein.

Referring next to FIG. 6, shown is a block diagram depicting physical components that may be utilized to realize several components of the disclosed framework and embodiments described herein. For example, the user-action capture devices 102, the test center 106, and test devices 108 may be realized by components that are generally represented in FIG. 6. Although the actual components that are used to realize the test center 106 may vary, especially in terms of physical size, from the components used to realize the test devices 108 and the user-action-capture devices 102, one of ordinary skill in the art will appreciate that the computer system 600 depicted in FIG. 6 generally represents the types of components that may be used to implement the test center 106 and mobile communication devices. For example, several embodiments of the test center 106, the test devices 108, and the user-action-capture devices 102 utilize storage 608 to store processor executable instructions. But the storage 608 is more likely to include a magnetic hard drive in the context of the test center 106, and in the context of the user-action capture devices 102 and the test devices 108, the storage 608 is more likely to include flash memory (e.g., NAND or ONENAND memory).

As shown, FIG. 6 depicts a computer system 600 within which a set of instructions can execute for causing a device to perform or execute any one or more of the aspects and/or methodologies of the present disclosure. The components in FIG. 6 are examples only and do not limit the scope of use or functionality of any hardware, software, embedded logic component, or a combination of two or more such components implementing particular embodiments.

Computer system 600 may include a processor 601, a memory 603, and storage 608 that communicate with each other, and with other components, via a bus 640. The bus 640 may also link a display 632, one or more input devices 633 (which may, for example, include a keypad, touch screen, a keyboard, a mouse, a stylus, a radio, a modem, etc.), one or more output devices 634 (e.g., a radio or modem), one or more storage devices 635, and various tangible storage media 636. All of these elements may interface directly or via one or more interfaces or adaptors to the bus 640. For instance, the various tangible storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 601 (or central processing unit(s) (CPU(s))) optionally contains a cache memory unit 602 for temporary local storage of instructions, data, or computer addresses. Processor(s) 601 are configured to assist in execution of non-transitory processor executable instructions. Computer system 600 may provide functionality as a result of the processor(s) 601 executing software embodied in one or more tangible processor-readable storage media, such as memory 603, storage 608, storage devices 635, and/or tangible storage media 636. The computer-readable media may store software that implements particular embodiments, and processor(s) 601 may execute the software.

For example, the control interface component 111, device testing component 112, user-action modification component 114, user-action consolidation component 116, and user-action capture component 118 may be realized by non-transitory, processor-executable instructions that are stored in the storage 608 and executed from RAM 604 by processors 601. Memory 603 may read the non-transitory, processor-executable instructions (also referred to herein as software) from one or more other computer-readable media (such as mass storage device 635 and/or tangible storage media 636) or from one or more other sources through a suitable interface, such as network interface 620. The software may cause processor(s) 601 to carry out one or more processes or one or more steps of one or more processes described or illustrated herein. Carrying out such processes or steps may include defining data structures stored in memory 603 and modifying the data structures as directed by the software.

The memory 603 may include various components (e.g., machine readable media) including, but not limited to, a random access memory component (e.g., RAM 604) (e.g., a static RAM "SRAM", a dynamic RAM "DRAM, etc.), a read-only component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable tangible computer-readable media described below. In one example, a basic input/output system 606 (BIOS), including basic routines that help to transfer information between elements within computer system 600, such as during start-up, may be stored in the memory 603. For instance, the memory 603 can store an identification of an access point or an identification of a networked device.

Storage 608 is connected bidirectionally to processor(s) 601, optionally through storage control unit 607. Storage 608 provides additional data storage capacity and may also include any suitable tangible computer-readable media described herein. Storage 608 may be used to store operating system 609, EXECs 610 (executables), data 611, API applications 612 (application programs), and the like. Often, although not always, storage 608 is a secondary storage medium (such as a hard disk) that is slower than primary storage (e.g., memory 603). Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide nonvolatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alpha-numeric input device (e.g., a keyboard), a pointing device (e.g., a mouse or touchpad), a touchpad, touchscreen, an audio input device (e.g., a microphone, a voice response system, etc.), an optical scanner, a video or still image capture device (e.g., a camera), and any combinations thereof. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, specifically networked devices, server systems, and access points connected to network 630. Communications to and from computer system 600 may be sent through network interface 620 (e.g., network interfaces 226, 236). For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other networked devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 (or network segment) include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology may be used.

Information and data can be displayed through a display 632. Examples of a display 632 include, but are not limited to, a liquid crystal display (LCD), an organic liquid crystal display (OLED), a cathode ray tube (CRT), a plasma display, and any combinations thereof. The display 632 can interface to the processor(s) 601, memory 603, and storage 608, as well as other devices, such as input device(s) 633, via the bus 640. The display 632 is linked to the bus 640 via a video interface 622, and transport of data between the display 632 and the bus 640 can be controlled via the graphics control 621. The display 632 may render text or graphics indicating that proximal networked devices are detectable access points or display portions of applications that require or request proximity.

In addition to a display 632, computer system 600 may include one or more output devices 634 including, but not limited to, an audio speaker, a printer, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, firmware, or a combination of two or more of hardware, software, and firmware.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or firmware depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, in firmware, or in a combination of two or more of these. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for testing mobile communication devices, the method comprising:
   receiving user-action data from each of a plurality of user-action-capture devices, the user-action data including data characterizing a plurality of user actions performed on the user-action-capture devices;
   creating a superset of generally-applicable-user-action data by consolidating the user-action data into generic representations of the user actions, each generic representation of a user action in the superset representing two or more similar user actions that occurred on two or more different ones of the user-action capture devices while each of the user-action capture devices was being used by a corresponding one of two or more users; and
   testing, using the generally-applicable-user-action data, mobile communication devices different from the user-action-capture devices.

2. The method of claim 1, including:
   translating at least a portion of the generic representations of the user actions in the superset into device-specific representations of the user actions specific to a particular mobile communication device; and
   sending the device-specific representations of the user actions to the particular mobile communication device to test the particular mobile communication device.

3. The method of claim 1, including:
   sending at least a portion the generic representations of the user actions in the superset to a particular mobile communication device; and
   translating the sent generic representations at the particular mobile communication device into user-actions specific to the particular mobile communication device.

4. The method of claim 1, including:
   modifying the superset of generally-applicable-user-action data in response to an indication by the testing that a modification to the generally-applicable-user-action data will improve the testing.

5. The method of claim 1, including:
   providing each of the plurality of user-action-capture devices to a corresponding one of a plurality of users.

6. The method of claim 1, wherein the user actions are user actions related to operations of components on the user-action-capture devices selected from among a browser, a dialer app, a contacts app, a media player, an app manager, a camera, a GPS system, a touchscreen, a volume control, a brightness control, a power management app, an NFC component, a Bluetooth component, an accelerometer, and an RF component.

7. The method of claim 1, wherein consolidating includes:
   consolidating the user-action data into tasklets that include an exercisable set of instructions in a format selected from among XML data and programming interface data.

8. A system for testing mobile communication devices, comprising:
   a plurality of user-action-capture devices that are each adapted to capture user-action data that characterizes a plurality of user actions that are performed on a corresponding one of each of the user-action-capture devices;
   a test center that is adapted to receive the user-action data from each of the plurality of user-action-capture devices, the test center including:
      a user-action consolidation component that creates a superset of generally-applicable-user-action data by consolidating the user-action data into generic representations of the user actions, wherein each of the generic representations of the user actions represents two or more similar user actions that occurred on two or more different ones of the user-action capture devices while each of the user-action capture devices was being used by a corresponding one of two or more users;
      a datastore to store the superset of the generally-applicable-user-action data; and
      a device testing component to test, using the generally-applicable-user-action data, mobile communication devices different from the user-action-capture devices.

9. The system of claim 8, wherein the device testing component is configured to:
   translate at least a portion of the generic representations of the user actions in the superset into device-specific representations of the user actions specific to a particular mobile communication device; and
   send the device-specific representations of the user actions to the particular mobile communication device.

10. The system of claim 8, wherein the user-action consolidation component is configured to consolidate the user-action data into tasklets that include an exercisable set of instructions in a format selected from among XML data and programming interface data.

11. A system for testing mobile communication devices, comprising:
   means for receiving user-action data from each of a plurality of user-action-capture devices, the user-action data including data characterizing a plurality of user actions performed on the user-action-capture devices;
   means for creating a superset of generally-applicable-user-action data by consolidating the user-action data into generic representations of the user actions, each generic representation of a user action in the superset representing two or more similar user actions that occurred on two or more different ones of the user-action capture devices while each of the user-action capture devices was being used by a corresponding one of two or more users; and
   means for testing mobile communication devices different from the user-action-capture devices using the generally-applicable-user-action data.

12. The system of claim 11, including:
   means for translating at least a portion of the generic representations of the user actions in the superset into device-specific representations of the user actions specific to a particular mobile communication device; and means for sending the device-specific representations of the user actions to the particular mobile communication device to test the particular mobile communication device.

13. The system of claim 11, including:
means for sending at least a portion the generic representations of the user actions in the superset to a particular mobile communication device; and
means for translating the sent generic representations at the particular mobile communication device into user-actions specific to the particular mobile communication device.

14. The system of claim 11, including:
means for modifying the superset of generally-applicable-user-action data in response to an indication by the testing that a modification to the generally-applicable-user-action data will improve the testing.

15. The system of claim 11, including:
means for providing each of the plurality of user-action-capture devices to a corresponding one of a plurality of users.

16. The system of claim 11, wherein the user actions are user actions related to operations of components on the user-action-capture devices selected from among a browser, a dialer app, a contacts app, a media player, an app manager, a camera, a GPS system, a touchscreen, a volume control, a brightness control, a power management app, an NFC component, a Bluetooth component, an accelerometer, and an RF component.

17. The system of claim 11, wherein means for consolidating includes:
means for consolidating the user-action data into tasklets that include an exercisable set of instructions in a format selected from among XML data and programming interface data.

18. A non-transitory, tangible computer readable storage medium, encoded with processor readable instructions to perform a method for testing mobile communication devices, the method comprising:
receiving user-action data from each of a plurality of user-action-capture devices, the user-action data including data characterizing a plurality of user actions performed on the user-action-capture devices;
creating a superset of generally-applicable-user-action data by consolidating the user-action data into generic representations of the user actions, each generic representation of a user action in the superset representing two or more similar user actions that occurred on two or more different ones of the user-action capture devices while each of the user-action capture devices was being used by a corresponding one of two or more users; and
testing, using the generally-applicable-user-action data, mobile communication devices different from the user-action-capture devices.

19. The non-transitory, tangible computer readable storage medium of claim 18, wherein the method includes:
translating at least a portion of the generic representations of the user actions in the superset into device-specific representations of the user actions specific to a particular mobile communication device; and
sending the device-specific representations of the user actions to the particular mobile communication device to test the particular mobile communication device.

20. The non-transitory, tangible computer readable storage medium of claim 18, wherein the method includes:
sending at least a portion the generic representations of the user actions in the superset to a particular mobile communication device; and
translating the sent generic representations at the particular mobile communication device into user-actions specific to the particular mobile communication device.

21. The non-transitory, tangible computer readable storage medium of claim 18, wherein the method includes:
modifying the superset of generally-applicable-user-action data in response to an indication by the testing that a modification to the generally-applicable-user-action data will improve the testing.

22. The non-transitory, tangible computer readable storage medium of claim 18, wherein the method includes:
providing each of the plurality of user-action-capture devices to a corresponding one of a plurality of users.

23. The non-transitory, tangible computer readable storage medium of claim 18, wherein the user actions are user actions related to operations of components on the user-action-capture devices selected from among a browser, a dialer app, a contacts app, a media player, an app manager, a camera, a GPS system, a touchscreen, a volume control, a brightness control, a power management app, an NFC component, a Bluetooth component, an accelerometer, and an RF component.

24. The non-transitory, tangible computer readable storage medium of claim 18, wherein consolidating includes:
consolidating the user-action data into tasklets that include an exercisable set of instructions in a format selected from among XML data and programming interface data.

* * * * *